United States Patent
Liu et al.

(10) Patent No.: US 10,719,061 B2
(45) Date of Patent: Jul. 21, 2020

(54) METHOD FOR JUDGING KEY MOMENTS IN WHOLE PROCESS OF MACHINING STEP FOR COMPUTER NUMERICAL CONTROL MACHINE TOOLS

(71) Applicant: Chongqing University, Chongqing (CN)

(72) Inventors: Fei Liu, Chongqing (CN); Junbo Tuo, Chongqing (CN); Chao Wang, Chongqing (CN); Daping Yang, Chongqing (CN); Congbo Li, Chongqing (CN)

(73) Assignee: Chongqing University, Chongqing (CN)

( * ) Notice: Subject to any disclaimer, the term of this patent is extended or adjusted under 35 U.S.C. 154(b) by 1 day.

(21) Appl. No.: 16/336,121

(22) PCT Filed: Apr. 7, 2017

(86) PCT No.: PCT/CN2017/079735
§ 371 (c)(1),
(2) Date: Mar. 25, 2019

(87) PCT Pub. No.: WO2018/058932
PCT Pub. Date: Apr. 5, 2018

(65) Prior Publication Data
US 2019/0278253 A1  Sep. 12, 2019

(30) Foreign Application Priority Data
Sep. 27, 2016 (CN) .......................... 2016 1 0854249

(51) Int. Cl.
*G05B 19/4065* (2006.01)
*G05B 19/408* (2006.01)
(Continued)

(52) U.S. Cl.
CPC ......... *G05B 19/4065* (2013.01); *G05B 19/19* (2013.01); *G05B 2219/35349* (2013.01); *G05B 2219/37533* (2013.01)

(58) Field of Classification Search
CPC ................ G05B 19/19; G05B 19/4065; G05B 2219/35349; G05B 2219/37533
See application file for complete search history.

(56) References Cited

U.S. PATENT DOCUMENTS 5,727,912 A * 3/1998 Rubashkin ......... G05B 19/4163
  409/132
6,874,980 B1 * 4/2005 Noelle ..................... B23Q 5/10
  408/6
(Continued)

FOREIGN PATENT DOCUMENTS

CN  103838181 A  6/2014
CN  103901813 A  7/2014
(Continued)

OTHER PUBLICATIONS

Wang,Qiulian et. al. "On-line monitoring and analysis system for energy efficiency of CNC machine tools" <Modern Manufacturing Engineering> Jan. 18, 2015, p. 39-p. 47.

*Primary Examiner* — Abdelmoniem I Elamin
(74) *Attorney, Agent, or Firm* — Gang Yu

(57) ABSTRACT

Some embodiments of the present disclosure provide a method for judging four key moments in a whole process (a feeding starting moment, an idling process, a cutting starting moment, cutting, a cutting ending moment, an idling process and a feeding ending moment) of a machining step for computer numerical control machine tools. The method includes that: the feeding starting moment and ending moment are determined according to a real-time execution state of a numerical control code; input power of a spindle of a machine tool is compared in real time with idling power (Continued)

to determine the cutting starting moment and ending moment; and for a special machining step in which power does not change obviously in a feeding process, the cutting starting and ending moments are determined in combination with a historical statistical average time of an idling process duration and a feeding moment.

2 Claims, 2 Drawing Sheets

(51) Int. Cl.
*G05B 19/414* (2006.01)
*G05B 19/19* (2006.01)

(56) References Cited

U.S. PATENT DOCUMENTS

| | | | |
|---|---|---|---|
| 9,008,822 B2* | 4/2015 | Wang | G05B 19/4065 29/36 |
| 10,055,512 B2* | 8/2018 | Stochosky | G06F 30/00 |
| 2007/0177128 A1* | 8/2007 | Ando | G05B 19/182 356/28 |
| 2011/0316335 A1* | 12/2011 | Bretschneider | G05B 19/4063 307/11 |
| 2014/0064317 A1* | 3/2014 | Honda | H01S 3/09702 372/61 |
| 2014/0228998 A1* | 8/2014 | Jiang | G05B 19/414 700/186 |
| 2015/0105890 A1* | 4/2015 | Stochosky | G05B 19/40937 700/98 |
| 2016/0132033 A1* | 5/2016 | Kao | G05B 19/048 700/291 |
| 2017/0308057 A1* | 10/2017 | Kreidler | G05B 19/4069 |
| 2017/0308058 A1* | 10/2017 | Kreidler | G05B 19/4163 |
| 2019/0143467 A1* | 5/2019 | Wang | G01N 3/58 700/175 |

FOREIGN PATENT DOCUMENTS

| | | |
|---|---|---|
| CN | 103941644 A | 7/2014 |
| CN | 104808584 A | 7/2015 |
| CN | 106154977 A | 11/2016 |
| JP | 2013188831 A | 9/2013 |

* cited by examiner

METHOD FOR JUDGING KEY MOMENTS IN WHOLE PROCESS OF MACHINING STEP FOR COMPUTER NUMERICAL CONTROL MACHINE TOOLS

TECHNICAL FIELD

The disclosure relates to a technical field of computer numerical control machine tools, and particularly to a method for judging key moments in a whole process of a machining step for computer numerical control machine tools.

BACKGROUND

A whole process of a machining step for a machine tool consists of multiple steps, from a feeding starting moment, to idling process, to cutting starting moment, to cutting process, to cutting ending moment, to idling process and then to the feeding ending moment. Wherein, a cutting process refers to a process that when a cutting tool of the machine tool contacts with a workpiece and removes material. Online automatic judgment in the cutting process is a core for acquisition of key running parameters of the machine tool such as effective running time (cutting time) and the effective utilization (cutting time/running time). Besides, wear of the cutting tool, energy consumption for cutting, consumption of cooling fluid are all exist in the cutting process. Therefore, judgment about key moments in the whole process of the machining step plays an important role in contributing to real-time acquisition of service time of the cutting tool, online monitoring of effective energy utilization and online monitoring of the production status of the machine tool and the like.

At present, an existing cutting time acquired by communication of the computer numerical control machine tools is actually a tool feeding time of the machine tool, also called cutting feed time. However, the tool feeding time of the machine tool includes the cutting time and idling process time. As the service time of the machine tool increases, the idling process time also increases, so a cutting time error, generated by this method, of the machine tool will also increase.

Researches on cutting processes of machine tools are made throughout the world. According to Chinese Patent No. CN103838181A, a working process of a machine tool is judged according to a change characteristic of a current signal when a spindle of the machine tool is loaded. However, since current change characteristics in some finish machining processes are not so obvious and uncontrollable random fluctuations of current signals are relatively great, it is difficult to judge cutting starting and ending moments of such machining. According to US Patent (US 20140212236 A1), multi-element sensors are mounted at a cutting tool and a spindle to judge a cutting process of the computer numerical control (CNC) machine tools. However, mounting the sensor at the spindle of the machine tool may cost too much and even may influence normal work of the machine tool. In Canadian Patent (CA 2063887), a multi-displacement monitoring device is adopted to monitor a path of a cutting tool in a cutting process of a machine tool, but the accurate moment when the cutting tool contacts with a workpiece cannot be directly judged. In Chinese Patent No. CN104808584A, a device utilization state of a machine tool is monitored on line by use of a power change characteristic of the machine tool and a man-machine interaction method. However, cutting fluid and transparency of a safety door may influence accuracy of manual visual judgment, which reduces monitoring accuracy.

From the above, existing technologies for judging a cutting process for a machine tool mainly have the problems of high apparatus cost, inconvenience for mounting, lower judgment accuracy of some finishing cutting processes, difficulty in judgment about idling process and the like.

SUMMARY

In order to solve the shortcomings of a prior art, some embodiments of the present disclosure provide a method for judging key moments in a whole process of a machining step for a CNC machine tools, which can accurately judge a cutting state and idling process state in the machining step and is favorable for accurately making statistics on an effective running time and an effective utilization of the machine tool.

In order to solve these technical problems, some embodiments of the present disclosure are implemented through the following technical solution.

The method for judging key moments in the whole process of the machining step for the CNC machine tools is provided. Before judgment, an input power range $P_{Umin} \sim P_{Umax}$ of a spindle of the computer numerical control machine tools in an idling process state is acquired and stored, and during judgment process, the following steps are included:

a) when a workpiece is machined, reading an execution state of a numerical control code (NC code) of the computer numerical control machine tools in real time, acquiring and recording an execution starting moment $t_{U1s}$ of a cutting feeding code, and then judging the execution starting moment $t_{U1s}$ as a feeding starting moment $t_{U1s}$ as well as a starting moment $t_{U1s}$ of a first idling process state in the machining step;

b) after a first idling process in the machining step is started, acquiring a real-time input power $P_i$ of the spindle of the computer numerical control machine tools, and when the input power $P_i$ increases and exceeds maximum input power $P_{Umax}$ of the spindle in an idling process state, recording this increasing moment, and then judging the increasing moment as a starting moment $t_{Cs}$ of a cutting state in the machining step as well as an ending moment of the first idling process state;

c) after the cutting state in the machining step is started and when the input power $P_i$ decreases to be lower than $P_{Umax}$ and is kept within the input power range $P_{Umin} \cdot P_{Umax}$ of the spindle in the idling process state, recording this decreasing moment and judging the decreasing moment as an ending moment $t_{Ce}$ of the cutting state in the machining step as well as a starting moment of a second idling process state; and d) after the cutting state in the machining step is ended, reading the execution state of the NC code of the computer numerical control machine tools in real time, acquiring and recording an execution ending moment $t_{U2e}$ of the cutting feeding code, and judging the execution ending moment $t_{U2e}$ as a feeding ending moment $t_{U2e}$ in the machining step as well as an ending moment $t_{U2e}$ of the second idling process state.

In the method, the cutting feeding code in Step a) refers to a code executed for machining, and is usually represented as a feeding code, before it, an executed NC code is usually a rapid feed code, and after it, an executed NC code is usually a rapid return code. Therefore, rapid feed, rapid return and feeding are usually recognized by combining a feeding speed and a G code command in software, a moment when the rapid feed code changes to a feeding code is approximately judged as a starting moment of executing the cutting feeding code, and a moment when the feeding code changes to the rapid return code is approximately judged as an ending moment of executing the cutting feeding code.

In Step b) and Step c), the starting and ending moments of the cutting state are judged by use of a change characteristic of the input power of the spindle because energy consumed by material removal is mainly from the spindle in the cutting process of the machine tool. In the idling process state, a cutting tool is unloaded, thus the input power of the spindle of the machine tool is relatively low and kept within a certain fluctuation range $P_{Umin}$~$P_{Umax}$, and such a fluctuation is relatively small and is mainly caused by instability of a power supply voltage of a machining workshop. In the cutting state, after the cutting tool starts contacting with the workpiece, deformation or removal of a material of the workpiece increases the input power of the spindle of the machine tool on the basis of that in the idling process state of the machine tool, and the input power is higher than the maximum input power $P_{Umax}$ of the spindle of the machine tool in the idling process state; and thus, the input power of the spindle of the machine tool is compared in real time with the input power $P_{Umin}$~$P_{Umax}$ of the spindle in the idling process state, and when the input power increases and exceeds the maximum input power $P_{Umax}$ in the idling process state, the cutting starting moment is judged. Similarly, when the cutting tool leaves the workpiece, the input power of the spindle of the machine tool decreases from a relatively large value in the cutting state to a relatively small value in the idling process state and is kept within $P_{Umin}$~$P_{Umax}$ and thus, when the input power of the spindle of the machine tool decreases to be lower than $P_{Umax}$ and is kept within $P_{Umin}$~$P_{Umax}$, the machine tool is judged to enter the idling process state from the cutting state, that is, the cutting ending moment is judged. Based on the process, a first idling process state, a cutting state and a second idling process state in the machining step are accurately determined, and the starting and ending moments in each state are recorded. Therefore, time occupied by each state can be calculated, and an effective running time and an effective utilization of the machine tool can be accurately counted.

During practical engineering, in some machining steps, due to cutting output and energy consumption for removing workpiece material are quite small, so that the spindle power of the spindle of the machine tool in the cutting process does not change obviously. In an exemplary embodiment, for such machining steps, in an execution process $t_{U1s}$~$t_{U2e}$ of the cutting feeding code, when the real-time input power $P_i$ of the spindle is kept within the input power range $P_{Umin}$~$P_{Umax}$ of the spindle in the idling process state, the method further includes following steps:

reading an average time $\overline{T_{U1}}$ of all first idling process state durations and an average time $\overline{T_{U2}}$ of all second idling process state durations; judging a sum of the average time $\overline{T_{U1}}$ of the first idling process state durations and the feeding starting moment $t_{U1s}$ in the machining step for judgment as the starting moment $t_{Cs}$ of the cutting state; and judging a subtraction of the average time $\overline{T_{U2}}$ of the second idling process state durations from the feeding ending moment $t_{U2e}$ in the machining step as the ending moment $t_{Ce}$ of the cutting state.

During the practical engineering, idling process time of the machine tool is usually related to an operation habit of an operator but does not differ greatly. By adopting the detection method, the first idling process state durations $T_{U1}$ and the second idling process state durations $T_{U2}$ in historical machining steps of the machine tool are averaged to correct the starting moments and ending moments of the idling process and cutting states in the step, judgment accuracy of the whole process can be improved.

From the above, some embodiments of the disclosure have the advantages of capability in accurately judging the cutting state and the idling process state in the machining step, favorability for accurately making statistics on the effective running time and the effective utilization of the machine tool and the like.

Compared with the conventional art, some embodiments of the disclosure have the following advantages.

1: According to the method provided in the patent for judging the key moments in the whole process of the machining step of the computer numerical control machine tool, a contact or separation moment between the cutting tool and the workpiece in the whole process of the machining step of the computer numerical control machine tool can be accurately judged.

2: An embodiment of the present disclosure provides the method for judging the key moments in the whole process of the machining step for the CNC machine tools, the method adopts the input power of the spindle for judgment, and usually acquires the input power through an electric power parameter sensor or a power sensor, and compared with adoption of a method of mounting a strain gauge, an acceleration sensor and the like, adoption of this method ensures more simplicity and convenience for mounting and lower cost.

3: According to the method provided in an embodiment of the present disclosure for judging the key moments in the whole process of the machining step for the CNC machine tools, statistics can be accurately made to cutting time in the machining step in real time to facilitate subsequent online acquisition of the effective utilization of the machine tool.

BRIEF DESCRIPTION OF THE DRAWINGS

In FIG. 1: 1, turning tool, 2, workpiece, 11, rapid feed path, 12, first idling process path, 13, cutting path, 14, second idling process path and 15, rapid return path.

DETAILED DESCRIPTION OF THE EMBODIMENTS

Some embodiments of the disclosure will be further described below in combination with the drawings.

Figure 1:
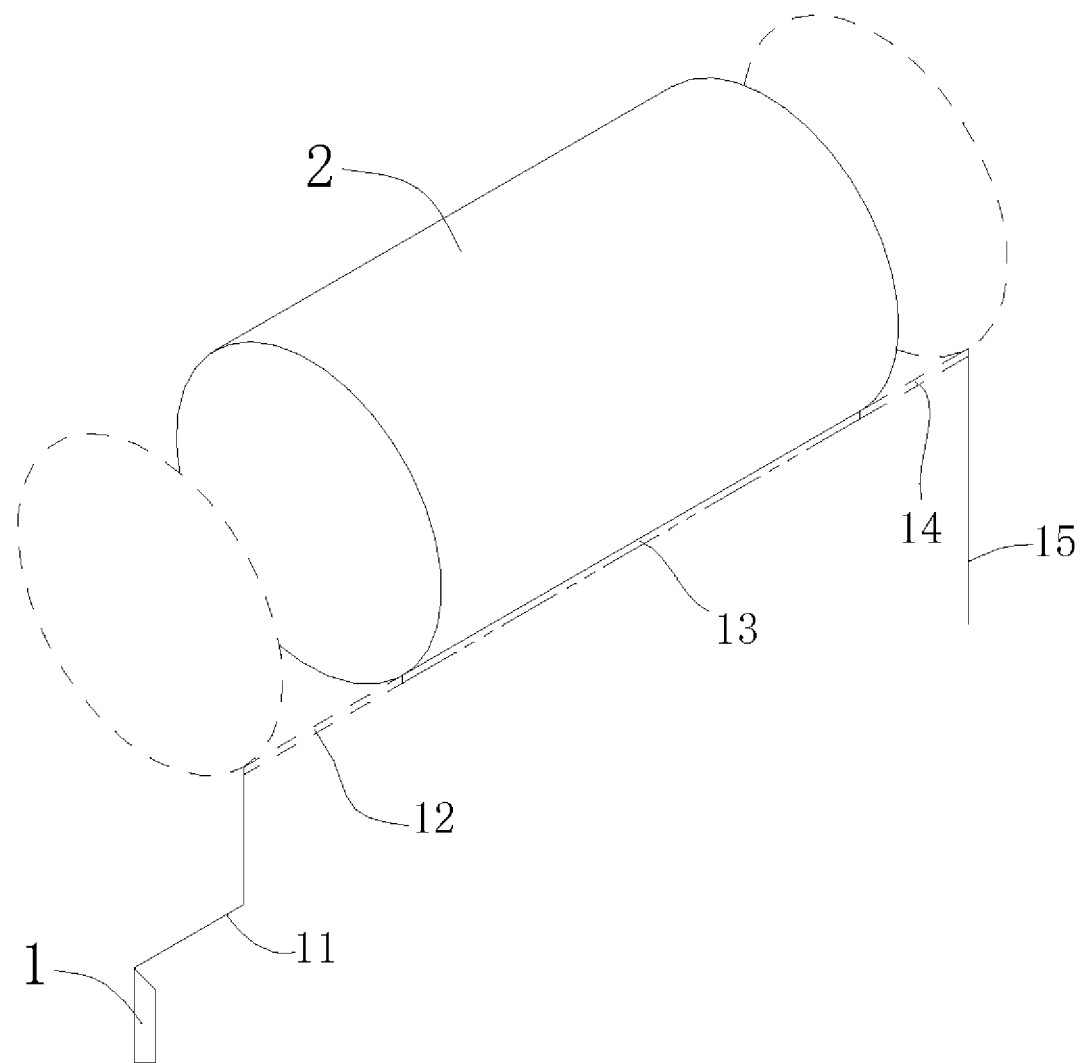
FIG. 1 is a schematic diagram of a rough turning of external cylinder process.

During specific implementation: during machining of a machine tool, a feeding route for a complete step is: a reference point of the machine tool→a clearance plane→workpiece cutting→the clearance plane→the reference point of the machine tool. Herein, the clearance plane refers to a plane created in a space close to a surface of a workpiece to prevent collision between a cutting tool moving fast and the surface of the workpiece, and a speed of the cutting tool between the plane and the surface of the workpiece is a cutting feed speed. In this feeding process, a process that the cutting tool gets close to the surface of the workpiece from the clearance plane at the feeding speed (or returns to the clearance plane from the surface of the workpiece after cutting) is called idling process. Under a normal condition, a complete machining step includes two idling processes: a first idling process refers to a process that, before cutting, the cutting tool leaves the clearance plane and gets close to the surface of the workpiece at the feeding speed; and a second idling process refers to a process that, after cutting is completed, the cutting tool leaves the surface of the workpiece and gets close to the clearance plane or a process that the cutting tool leaves the surface of the workpiece and leads to a coordinate origin of the machine tool at the feeding speed. For example, as shown in FIG. 1, two idling processes in a rough turning of external cylinder process refer to feeding processes in the vicinity of two end faces of the workpiece. Time for completing the whole idling process is idling process time. During practical engineering, the idling process time usually depends on an operation habit of a worker and a machining space of the machine tool, and is almost unrelated to selection of a machining type such as finish machining, semi-finish machining and rough machining.

Therefore, judgment about a key in a whole process of a machining step for CNC machine tools includes the following steps.

In a), an input power $P_{Umin}$~$P_{Umax}$ of a spindle of the machine tool in an idling process state is acquired off-line and stored.

In b), a feeding starting moment of the machining step is judged.

When feeding is started, there is a distinctive characteristic that a feeding speed of a cutting tool changes obviously and executed codes are obviously different. The feeding starting moment is acquired by reading a numerical control code executed by the CNC machine tools in real time and analyzing this change characteristic. When the numerical control code is changed from a rapid moving code to a cutting feeding code, a feeding starting moment $t_{U1s}$ (i.e., a first idling process starting moment) of the machining step is recorded. For example, when a code presently executed by a FANUC system changes from a rapid moving code "G00 X_Y_Z_" to a feeding code "G01 Z_F_", feeding of the machining step is started. In the formula, "X_Y_Z_" is a coordinate of the machine tool, and "F_" is a feeding rate of the machine tool.

In c), a cutting starting moment and ending moment of the machining step are judged.

After idling process is started, the input power $P_{Umin}$~$P_{Umax}$ of the spindle of the machine tool in the idling process state is compared in real time with a real-time input power $P_i$, and when $P_i > P_{Umax}$, this moment is recorded as the cutting starting moment.

In a cutting state, the input power $P_i$ of the machine tool is acquired in real time, and is compared with the input power $P_{Umin}$~$P_{Umax}$ of the spindle of the machine tool in the idling process state, and when $P_i \leq P_{Umax}$ and $P_{Umin} \leq P_i \leq P_{Umax}$ is kept, this decreasing moment is recorded as the cutting ending moment of the machining step.

In d), a feeding ending moment of the machining step is judged.

The feeding ending moment of the machining step is obtained by analyzing and monitoring the NC code executed in real time by the CNC machine tools: when the NC code presently executed by the CNC machine tools changes from a feeding code to a rapid return code, this moment is recorded as the feeding ending moment of the machining step, for example, a moment when a code presently executed by the FANUC system of the machine tool changes from the feeding code "G01 Z_F_" to a rapid return code "G00 X₀ Y₀ Z₀", X₀ Y₀ Z₀ in the formula is a reference point of the machine tool.

Figure 2:
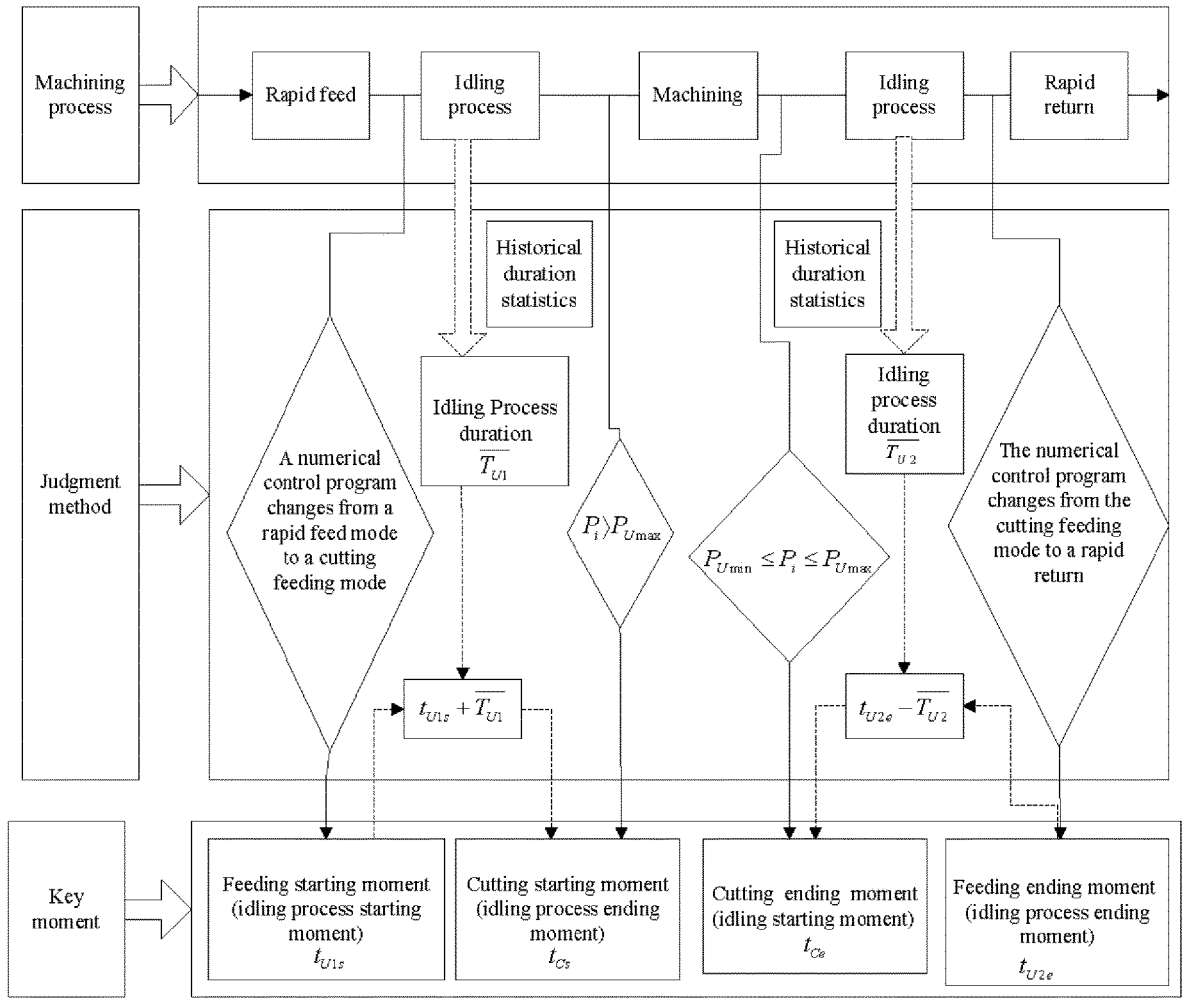
FIG. 2 is a flowchart of automatic judgment in a machining step.

From the above, a method for judging key moments in the whole process of the machining step for the CNC machine tools is implemented as follows: at first, the numerical control code executed in real time by a numerical control system of the machine tool is acquired through a numerical control communication technology, and the feeding starting moment and ending moment of the machining step of the CNC machine tools are judged according to a change characteristic thereof; and then, on such a basis, the starting moment and ending moment of the machining step are judged through the real-time input power of the machine tool and a change characteristic thereof. A flow of the whole judgment process refers to the solid line part in FIG. 2.

However, in some finish machining, due to cutting allowance and power requirement are relatively low, so that judgment for such a machining step according to the power change characteristic is usually low in accuracy and high in misjudgment rate. Therefore, for a machining step in which power does not change obviously in a feeding process, judgment about cutting starting and ending moments thereof is implemented in combination with a historical statistical average time of idling durations and a feeding moment, and a flow of a judgment process thereof refers to a dotted line part in FIG. 2, specifically as follows.

At first, first idling process state durations $T_{U1}$ and second idling process state durations $T_{U2}$ in all historical machining steps of the machine tool are acquired, and an average time $\overline{T_{U1}}$ of the first idling process state durations and an average time $\overline{T_{U2}}$ of the second idling process state durations are calculated respectively.

Then, judging a sum of the average time $\overline{T_{U1}}$ of the first idling process state durations and the feeding starting moment $t_{U1s}$ the machining step as the starting moment $t_{Cs}$ of the cutting state in the machining step, namely $t_{Cs} = t_{U1s} + \overline{T_{U1}}$, and subtracting the average time $\overline{T_{U2}}$ of the second idling process state durations from the feeding ending moment $t_{U2e}$ in the machining step for judgment as the ending moment $t_{Ce}$ of the cutting state, namely $t_{Ce} = t_{U2e} - \overline{T_{U2}}$.

There are two conditions for acquisition of the historical idling process state durations.

If machining with obviously changing power is performed by the machine tool before, the idling process duration $T_{U1}$ is calculated as $T_{U1} = t_{U1e} - t_{U1s}$ $T_{U2} = t_{U2e} - t_{U2s}$ In the formula, $t_{U1s}$ is a starting moment of a first idling process state during historical machining;

$t_{U1e}$ is an ending moment of the first idling process state during historical machining;

$t_{U2s}$ is a starting moment of a second idling process state during historical machining; and $t_{U2e}$ is an ending moment of the first idling process state during historical machining.

If machining is not performed by the computer numerical control machine tools before, a first idling process travel of such a machining step is required to be calculated and acquired by means of on-site investigation, specifically as follows: idling process time is estimated according to a habit of an operator of the machine tool and then is input by man-machine interaction, or the idling process time of such a same type of machine tool is manually statistically judged for a long time and then manually input.

Figure 3:
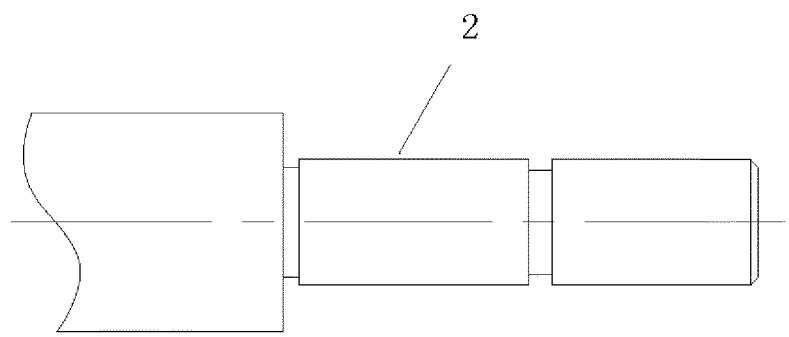
FIG. 3 is a structure diagram of a workpiece according to an embodiment.

Descriptions will be made below in combination with a process that a certain part is machined by a certain CNC machine tools as an example. A schematic diagram of the workpiece is shown in FIG. 3. A machining process includes rough turning of external cylinder, fine turning of external cylinder and rough turning of slot. An adopted sensor is an HC33-C3 electric power measurer, and a numerical control code is read and obtained from a numerical control system in real time at an interval of 0.25s by use of software. Before judgment, a fluctuation range 260 W~275 W of input power of a spindle of the CNC machine tools in an idling process state is measured off-line.

First, a Process of Rough Turning of External Cylinder

1: Acquisition of a Feeding Starting Moment and Ending Moment

A moment when the numerical control code presently executed by the CNC machine tools changes from "G00 X8.3" to "G1 Z1" is the feeding starting moment for rough turning of external cylinder. It is measured that the moment when such a change occurs to the numerical control code is 15:37:29.000 (time is represented as "hour: minute: second. millisecond" in this example), that is, the feeding starting moment is 15:37:29.000, and the code changes from "G01 X13 W-1.2" to "G00 X200" at 15:37:40.000, that is, the feeding ending moment for rough turning of external cylinder is 15:37:40.000.

2: Acquisition of a Cutting Starting Moment and Ending Moment

After idling process is entered, it is measured that the input power of the spindle is 269 W, and at 15:37:29.500, the input power of the spindle of the machine tool changes from 269 W to 489 W and is far higher than 269, that is, the cutting starting moment for rough turning of external cylinder of the CNC machine tools is 15:37:29.500, and then the machine tool is in a cutting state. It is measured on the spot that the power of the spindle in this state keeps fluctuating about 489 W, a maximum fluctuation range is 13 W and the power changes to 265 W at 15:37:39.000, that is, the cutting ending moment for rough turning of external cylinder is 15:37:39.000.

From the above, a first idling process duration and second idling process duration of this rough machining are 0.5s and 1s respectively.

Second, a Process of Fine Turning of External Cylinder

1: Acquisition of a Feeding Starting Moment and Ending Moment

The feeding starting moment for fine turning of external cylinder is a moment when the presently executed code changes from "G00 X7.935" to "G01 X8.05 Z-29.5 F300" and is measured on the spot to be 15:37:43.000, and the presently executed numerical control code changes from "G01 X14 F300" to "G00 X200 Z1" at 15:37:52.000. Based on this, starting moment and ending moment of feeding for fine turning of external cylinder are 15:37:43.000 and 15:37:52.000 respectively.

2: Acquisition of a Cutting Starting Moment and Ending Moment

The feeding starting moment 15:37:43.000 (i.e., a first idling process starting moment) and the first idling process duration 0.5s for rough turning of external cylinder are substituted into a formula $$t_{Cs} = t_{U1s} + \overline{T_{U1}}$$

to obtain the cutting starting moment 15:37:43.500 for fine turning of external cylinder.

Similarly, the feeding ending moment 15:37:52.000 (a second idling process ending moment) and the second idling process duration 1.0s for rough turning of external cylinder are substituted into a formula $$T_{U2} = t_{U2e} - t_{U2s}$$

to obtain the cutting ending moment 15:37:51.000 for fine turning of external cylinder.

Third, a Process of Rough Turning of Slot

1: Judgment of a Feeding Starting Moment and Ending Moment

A moment when the numerical control code presently executed by the CNC machine tools changes from "G00 Z13.25" to "G1 X7.05 F100" is the feeding starting moment for rough turning of slot, and is 15:37:56.000. The presently executed numerical control code changes from "G01 X8.5" to "G00 X10 Z1" at 15:37:59.000, that is, the feeding ending moment is 15:37:59.000.

2: Judgment of a Cutting Starting Moment and Ending Moment

After cutting feed is started, the power of the spindle is 269 W, and the input power changes from 269 W to 316 W at 15:37:56.500, that is, the cutting starting moment for rough turning of slot is 15:37:56.500. Then, the machine tool is in the cutting state, the power of the spindle fluctuates within an approximately 12 W range centered about 325 W, and the power changes to 269 W at 15:37:58.000, that is, the cutting ending moment for rough turning of slot of the CNC machine tools is 15:37:58.000.

Fourth, Analysis of a Judgment Result

At the same time of adopting the method to acquire the key moments for the machining step, a stopwatch recording and manual judgment manner is adopted to acquire the cutting moments for precision comparison in some embodiments of the disclosure. For conveniently comparing results and converting stopwatch test results into a time mode in the method, the cutting moments ("minute: second. millisecond") acquired by two methods refer to the following table.

|  | Rough turning of external cylinder | | Fine turning of external cylinder | | Rough turning of slot | |
| --- | --- | --- | --- | --- | --- | --- |
| Automatic judgment | 37:29.500 | 37:39.000 | 37:43.500 | 37:51.000 | 37:56.500 | 37:58.000 |
| Manual measurement | 37:29.800 | 37:39.420 | 37:44.000 | 37:50.310 | 37:56.700 | 37:58.000 |

By comparison between experimental results, it can be seen that judgment accuracy of the key moments of the machining step in the embodiment of the present disclosure is relatively high: a judgment error for a rough machining step is smaller than 0.5s, and an error for a finishing machining step is relatively large but also within 1s.

The above is only the preferred embodiment of the disclosure and not intended to limit the disclosure. Any modifications, equivalent replacements, improvements and the like made within the spirit and principle of the disclosure shall fall within the scope of protection of the disclosure.

What is claimed is:

1. A method for judging key moments in a whole process of a machining step for computer numerical control machine tools, wherein, before judgment, an input power range $P_{Umin} \sim P_{Umax}$ of a spindle of the computer numerical control machine tools in an idling process state is acquired and stored, and during judgment process, following steps are comprised:

when a workpiece is machined, reading an execution state, of a numerical control code of the computer numerical control machine tools in real time, acquiring and recording an execution starting moment $t_{U1s}$ of a cutting feeding code, and then judging the execution starting moment $t_{U1s}$ as a feeding starting moment $t_{U1s}$ in the machining step as well as a starting moment $t_{U1s}$ of a first idling state;

after a first idling process in the machining step is started, acquiring a real-time input power $P_i$ of the spindle of the computer numerical control machine tools, and when the input power $P_i$ increases and exceeds maximum input power $P_{Umax}$ of the spindle in an idling process state, recording an increasing moment, and then judging the increasing moment as a starting moment $t_{Cs}$ of a cutting state in the machining step as well as an ending moment of the first idling process state;

after the cutting state in the machining step is started and when the input power $P_i$ decreases to be lower than $P_{Umax}$ and is kept within the input power range $P_{Umin} \sim P_{Umax}$ of the spindle in the idling process state, recording a decreasing moment and then judging the decreasing moment as an ending moment $t_{Ce}$ of the cutting state in the machining step as well as a starting moment of a second idling state; and after the cutting state in the machining step is ended, reading the execution state of the numerical control code of the computer numerical control machine tools in real time, acquiring and recording an execution ending moment of the cutting feeding code, and judging the execution ending moment as a feeding ending moment $t_{U2e}$ in the machining step as well as an ending moment $t_{U2e}$ of the second idling process state.

2. The method for judging the key moments in the whole process of the machining step for the computer numerical control machine tools as claimed in claim 1, wherein in an execution process $t_{U1s} \sim t_{U2e}$ of the cutting feeding code, when the real-time input power $P_i$ of the spindle of the computer numerical control machine tools is kept within the input power range $P_{Umin} \sim P_{Umax}$ of the spindle in the idling process state, the method further comprises following steps:

reading first idling process state durations $T_{U1}$ and second idling process state durations $T_{U2}$ in all historical machining steps of the computer numerical control machine tools, and calculating an average time $\overline{T_{U1}}$ of the first idling process state durations and an average time $\overline{T_{U2}}$ of the second idling process state durations respectively; and judging a sum of the average time $\overline{T_{U1}}$ of the first idling process state durations and the feeding starting moment $t_{U1s}$ in the machining step as the starting moment $t_{Cs}$ of the cutting state, and subtracting the average time $\overline{T_{U2}}$ of the second idling process state durations from the feeding ending moment $t_{U2e}$ in the machining step for judgment as the ending moment $t_{Ce}$ of the cutting state.

* * * * *